US006751183B2

United States Patent
Hou

(10) Patent No.: US 6,751,183 B2
(45) Date of Patent: Jun. 15, 2004

(54) LOWER INERTIAL COMPACT DISK DRIVING DEVICE

(75) Inventor: Chien-Tzu Hou, Fremont, CA (US)

(73) Assignee: Pro-Techtor International, Saratoga, CA (US)

( * ) Notice: Subject to any disclaimer, the term of this patent is extended or adjusted under 35 U.S.C. 154(b) by 249 days.

(21) Appl. No.: 10/068,900

(22) Filed: Feb. 11, 2002

(65) Prior Publication Data
US 2003/0152016 A1 Aug. 14, 2003

(51) Int. Cl.[7] .......................... G11B 17/00; G11B 21/16; G11B 3/40; G11B 3/14
(52) U.S. Cl. ....................................... 369/244; 369/177
(58) Field of Search ................................. 369/244, 176, 369/215, 254, 251, 249

(56) References Cited

U.S. PATENT DOCUMENTS

| | | | | | |
|---|---|---|---|---|---|
| 3,193,295 | A | * | 7/1965 | Isemura | 369/177 |
| 4,403,316 | A | * | 9/1983 | van de Veerdonk | 369/244 |
| 4,473,898 | A | * | 9/1984 | Ono | 369/221 |
| 4,554,653 | A | * | 11/1985 | Malissin et al. | 369/244 |
| 5,327,417 | A | * | 7/1994 | Tanaka et al. | 369/219 |
| 5,870,249 | A | * | 2/1999 | Yanagisawa | 369/177 |
| 5,894,460 | A | * | 4/1999 | Yanagawa et al. | 369/13.37 |
| 6,563,783 | B1 | * | 5/2003 | Hou | 369/244 |

* cited by examiner

Primary Examiner—George J. Letscher
Assistant Examiner—C R Beacham
(74) Attorney, Agent, or Firm—Pro-Techtor International

(57) ABSTRACT

A lower inertial compact disk driving device is disclosed. The disk and laser head are static and optical unit device are used as a medium of the laser optical path. Furthermore, a rough tracing unit device is used to change the optical path projected by optical unit device on the compact disk, a precise tracing unit device is used to control the optical spot to emit to the desired compact disk track precisely; the precise tracing unit device includes two fixed shelves, two permanent magnets, a tracing movable block and a balance movable block, the tracing movable block and balance movable block are wound around focus coils, respectively, and are hung between two fixed shelves by elastic wire, the central thereof is installed with the steel wire whose end connects to the optical unit device. The focusing error from the laser beam passing through the optical unit device is converted into a focusing driving voltage which is applied to the focus coil so that a magnetic field is generated. This field is interacted with permanent magnets so that the focus coil moves leftwards and rightwards slightly, thereby the steel wire is moved to displace the optical unit device and trace precisely, thus the laser beam can move precisely from current track to target track.

11 Claims, 7 Drawing Sheets

LOWER INERTIAL COMPACT DISK DRIVING DEVICE

BACKGROUND OF THE INVENTION

1. Field of the Invention

The present invention relates to a lower inertial compact disk driving device, and particularly to a lower inertial compact disk driving device, wherein an optical unit device is used as a medium of the laser beam, thereby, the optical spot is traced more instantaneously and precisely on a disk through a tracing device.

2. Description of the Prior Art

In the current compact disk driving device, the disk rotates and the laser head makes a straight and reciprocal movement. The prior technical lower speed compact disk drive uses a constant linear velocity (CLV) or constant angular velocity (CAV). The laser head has the constant speed as reading data. Another conventional way is used to increase the reading speed by increasing the rotation speed. Some current compact disk drive and DVD ROM use "True X" multi-beam technology, which is used to assure the reading in the whole disk has the same speed. The speed changes only when the mass of the compact disk and the operation system are different.

The technologies for reading DVD are not the same in different kinds of compact disk drives. In the prior art, to be compatible with the common CD ROM, the DVD ROM uses two heads technology to realize the auto adjustment of the servo unit device of a compact disk driving device so that the accuracy of reading data is improved. Double dynamic shock suspending (DDSS) system is used to effectively reduce the shock as a compact disk drive rotates with a high speed. Auto balance system (ABS) is used to retain the disk to be horizontal so that the reading ability of the compact disk is improved. Automatic intelligent error correction is used so that the reading amount of a disk is improved greatly. The above said many technologies cause the performance of a compact disk driving drive to be improved. However, current compact disk driving device uses a high rotation speed disk and a laser head of straight and reciprocal movement. The inertial of the disk is too large and the mass of the laser head is large. Therefore, the current used compact disk driving device consumes much power and has a large shock so that the moving range of the disk is confined. For example the current compact disk drive cannot be used in a personal digital assistant (PDA), which has the function of calculation, phone, facsimile, network, etc. These functions can be realized wirelessly. The extra equipment of PDA consumes low power. However, current compact disk drive has large rotation inertia and the laser head is heavy and thus cannot realize the object of lower power consumption.

Furthermore, due to the inner shaft hole of compact disk is biased and there is a gap existed to compensate for expansion and contraction, the central error will be produced when installing compact disk, and due to further gap of bearing, the tunnel and the rotary axle are not concentric and cause the tunnel to displace along the radial. Besides, the contraction rate in various directions of the compact disk is different so as to produce deformation. Thus, the major object of radial tracking servo is to drive the optical head to move from current track to target track in a least time while retaining the interference in tunnel center between tunnels and reducing the signal voltage.

Due to the effects that the information lines of compact disk drive is spiral and the compact disk and station are not concentric, the beam emitted to the information lines will depart from the race information lines continuously during read/write process. According to the analysis and research, to read/write the information correctly, while ensuring the precision focusing, the tracking error must be controlled within ±0.1 $\mu$m. Only if the deviation of the center of the beam emitted on read/write information lines is less than 0.1 $\mu$m, the read data can be ensured correctly. However, practically, due to the compact disk and station deviation may be up to 70 $\mu$m, a close loop focus control loop must be used to achieve high precision tracing. The methods for detecting radial error signal of traditional optical head are numerous; the commonest are three light beam method, push-pull method, etc. In holographic lens, radial tracking servo generally uses push-pull method. However, the present technical focusing device is installed on the laser head and moves straightly and reciprocally with laser head. Since the focus coil is heavy, the straight and reciprocal movement will cause a large instantaneous speed and thus a large electric power is consumed.

SUMMARY OF THE INVENTION

Accordingly, the primary object of the present invention is to provide a lower inertial compact disk driving device wherein in operation, the laser head and the disk are static. A displacing device is used to change the position of the laser beam incident upon a disk.

Another object of the present invention is to provide a lower inertial compact disk driving device, wherein the focus of the laser beam from the laser head is precisely located at the optical recording surface by a precise tracing unit device. The focus of the laser beam emitted from laser head can move precisely form current track to target track.

A further object of the present invention is to provide a lower inertial compact disk driving device, wherein a close loop focus control loop is used, and light spot detect method is used to detect servo signal. The focusing servo signal is phase and amplitude compensated and then is amplified so as to drive a focusing device to control the movement of a focusing lens and thus optical spot is radiated to a disk precisely.

The various objects and advantages of the present invention will be more readily understood from the following detailed description when read in conjunction with the appended drawings.

DETAILED DESCRIPTION OF THE PREFERRED EMBODIMENT

The disk 20 in the present invention is a storage medium of computer document, which includes an ISO-9660, Romeo, and others.

Figure 1:
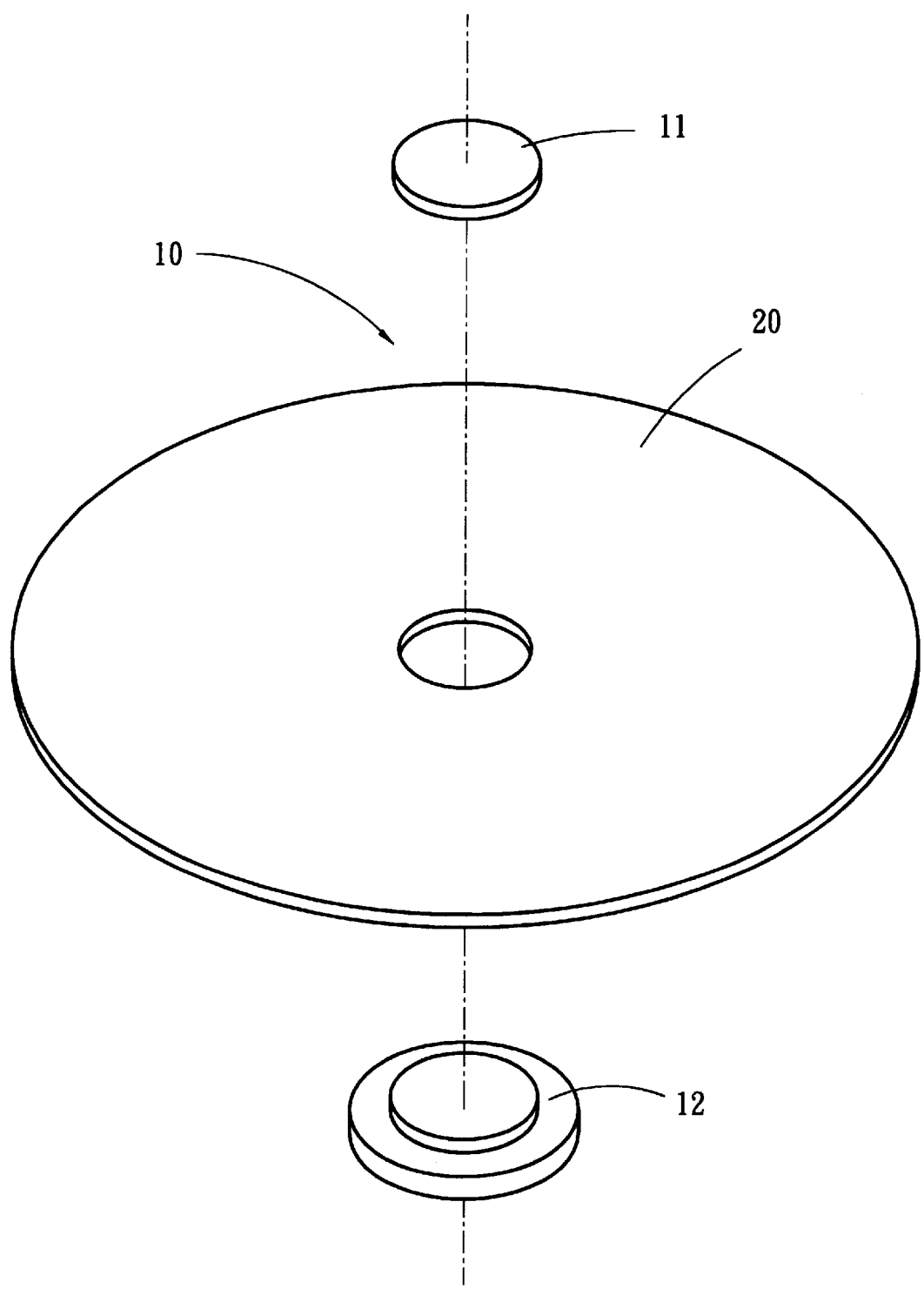
FIG. 1 is a schematic view showing the installation of the disk of the present invention.

The present invention comprises the following elements:

A disk retainer device 10 (referring to FIG. 1) is formed by a disk press 11 and a disk supporter 12. The disk 20 is placed on the disk supporter 12. The disk press 11 presses the disk 20 on the disk supporter 12, thereby the disk 20 is fixed so that the disk 20 cannot rotate.

Figure 2A:
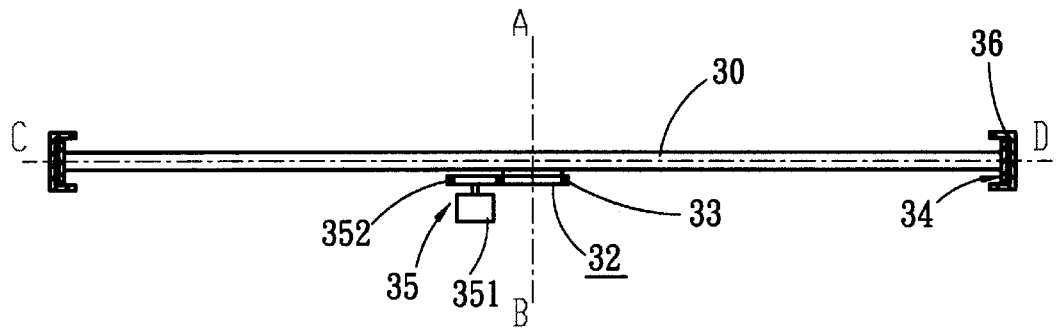
FIG. 2A is a schematic view showing the lateral view of the rotary needle of the present invention.
Figure 2B:
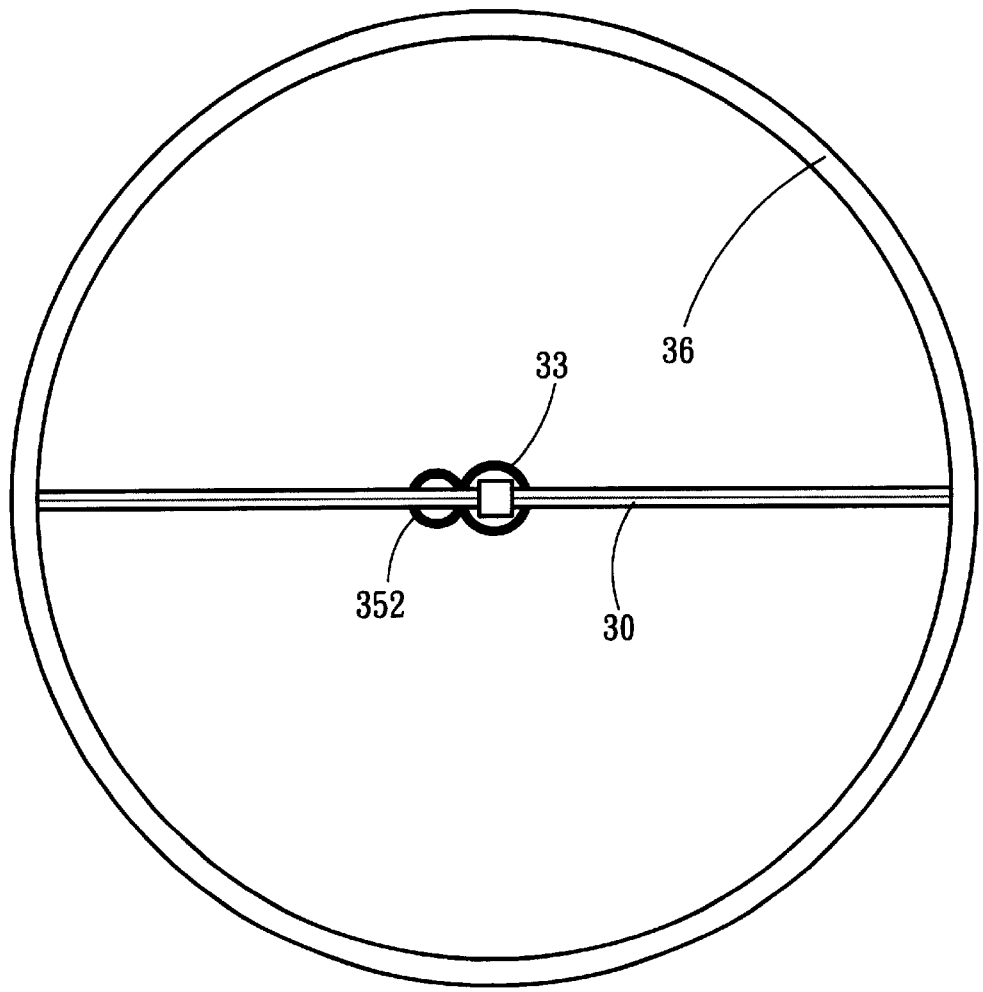
FIG. 2B is a schematic view showing the elevational view of the rotary needle of the present invention.
Figure 8:
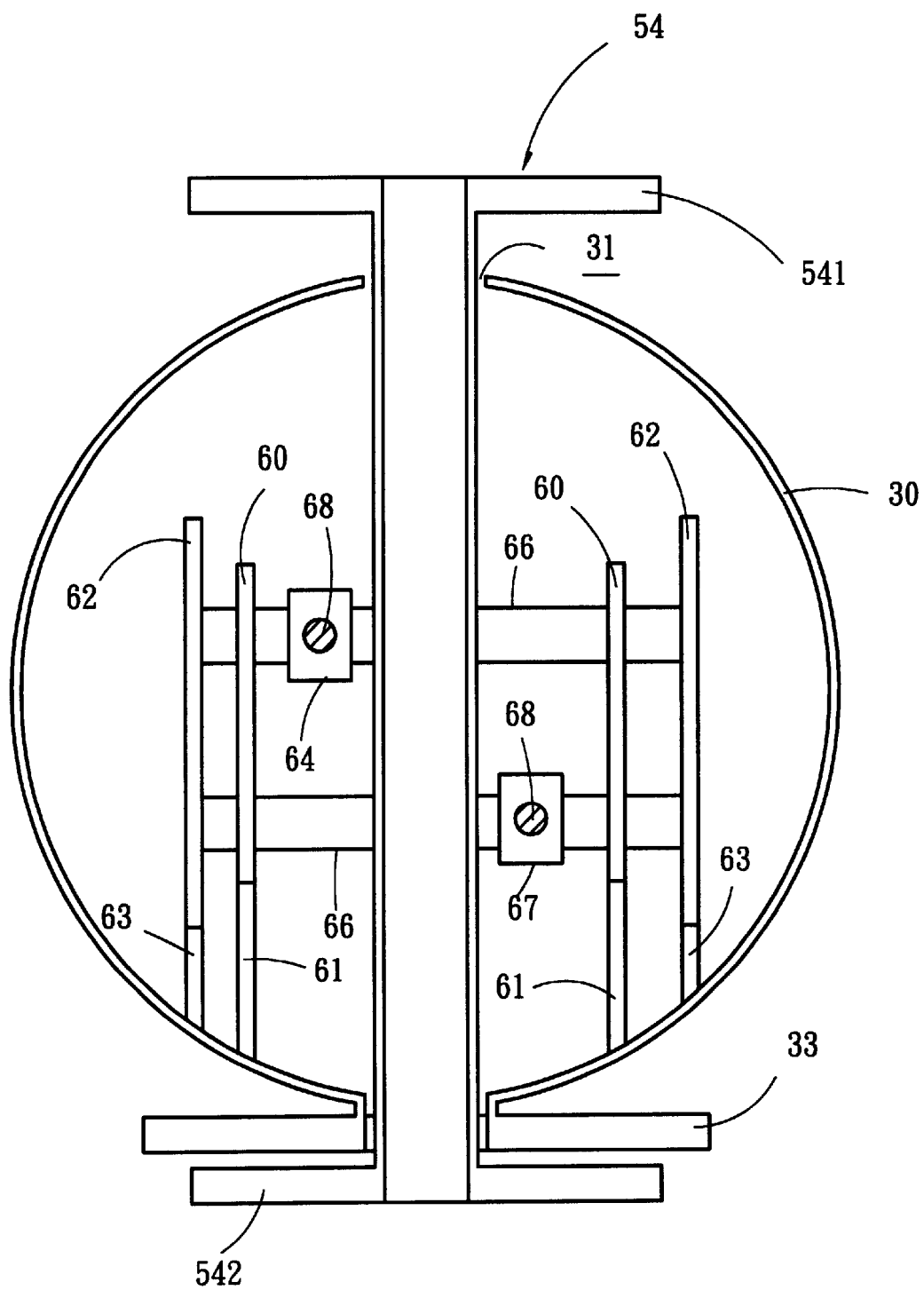
FIG. 8 is an enlarged view of A-B of FIG. 4.

A displacing device serves for controlling and changing the position that the optical beam emitted from a laser head radiates upon the disk 20. The displacing device includes the following elements:

A rotary needle 30 (referring to FIGS. 2A, 2B) is installed below the written surface of the disk 20 and is a hollow tube with a transversal groove 31 (referring to FIG. 8). A center of the rotary needle 30 has a hole 32. The lower side of the hole 32 protrudes with a gear 33 which is linked with the rotary needle 30. The center of the gear 33 is overlapped with the center of the rotary needle 30 for driving the rotary needle 30 to rotate.

Each of two ends of the rotary needle 30 has a respective light-floating wheel 34. The light-floating wheel 34 rotates continuously along the transversal central shaft C-D of the rotary needle 30. As the light-floating wheel 34 rotates, it is in contact with the inner of an annular device 36. The annular device 36 retains motionless for preventing the rotary needle 30 from vibration in high rotation speed so as to control the rotary needle 30 in a proper flexible deformation.

A rotary driving device 35 is combined with a driving motor 351 and a gear 352. The gear 352 is engaged with the gear 33. The driving motor 351 drives the gear 352 to rotate so as to drive the gear 33, so that the rotary needle 30 rotates along the central shaft A-B to rotate continuously.

Figure 3A:
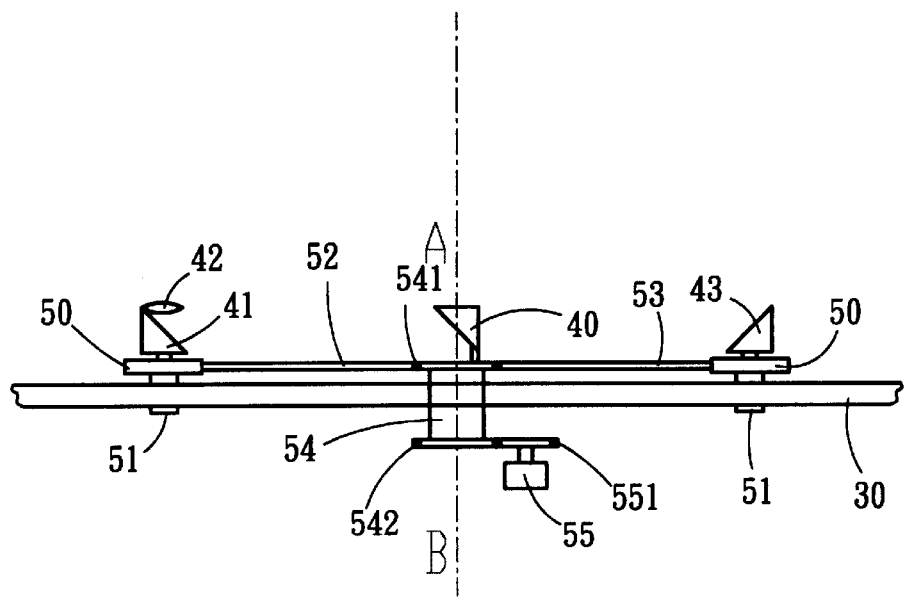
FIG. 3A is a lateral schematic view of the rough tracing mechanism of the present invention.
Figure 3B:
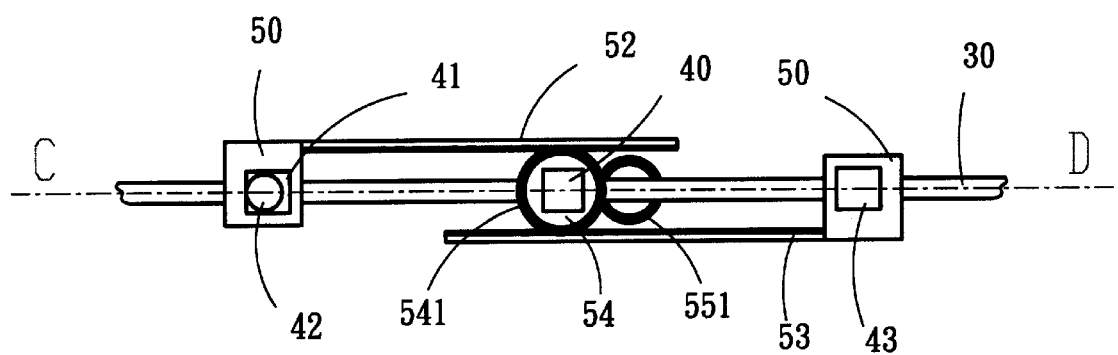
FIG. 3B is an elevational schematic view of the rough tracing unit device of the present invention.

A set of optical unit device (referring to FIGS. 3A, 3B) severs as a transfer unit device for transferring the optical beams emitted from the laser head 70. The optical unit device comprises the following elements:

A fixed reflector 40 is firmly secured to the center of the rotary needle 30 and used to reflect the laser beam to movable reflector 41 or laser head.

A movable reflector 41, there is a focusing lens 42 installed outside thereof at an appropriate angle for focusing the laser beam, which is used to focus the laser beam transferred from fixed reflector 40 to the compact disk 20 or transfer the beam reflected from the compact disk 20 to the fixed reflector 40.

A balance block 43 installed at an opposite side of the movable reflector 41 for retaining the balance of the rotary needle 30.

A rough tracing unit device (referring to FIGS. 3A, 3B) comprising:

Two movable plate 50 serving as the base for movable reflector 41 and balance block 43, wherein the bottom thereof has a set of bushes 51 which is engaged to the appropriate location at two sides of the rotary needle 30, respectively. And the side thereof have two racks 52, 53 installed at the side of movable reflector 41 and balance block 43, respectively.

A hollow driving unit device 54 is secured to the inner edge of the hole 31; the upper and lower ends further are installed with gears 541, 542; the upper gear 541 is engaged with the two racks 52, 53.

A servo motor 55 is engaged with a gear 551 which is further engaged to the lower gear 542 below the hollow driving unit device 54 for driving the movable reflector 41 and the balance block 43 to move straightly and reciprocally.

A servo motor 55 drives the gear 551 to drive the gear 542 at the lower end of the hollow driving unit device 54 to rotate so that the upper gear 541 of the hollow driving unit device 54 drives the two racks 52, 53 to move. Therefore, the racks 52, 53 move oppositely along a straight line so as to drive the movable reflector 41, focusing lens 42 and balance block 43 to move straightly along the C-D direction reciprocally. That is the moving direction of the balance block 43 is oppositely to the movable reflector 41 so as to retain the balance of the rotary needle 30. Therefore, the rotary needle 30 may retain in a dynamic balance as it rotates with a high speed. Since the fixed reflector 40 is firmly secured to the center of the rotary needle 30, it only rotates with the rotary needle 30 with a high speed so as to retain a respective angle between it and the reflector 41.

A precise tracing unit device (referring to FIGS. 5~8) serves for driving the movable reflector 41, focusing lens 42 and balance block 43 to move slightly leftwards and rightwards. As a consequence the optical spot can precisely radiate upon the target track of compact disk 20. The precise tracing unit device has the following elements.

Two permanent magnets 60 are installed vertically in the interior of the rotary needle 30 opposite to the hollow driving unit device 54 through the connector 61.

Two fixed shelves 62 are installed vertically in the interior of the rotary needle 30 and outside the two permanent magnets 60, and are opposite to the hollow driving unit device 54 through the connector 63.

A tracing movable block 64 having a through-hole 641, and the tracing coil 65 wound around the exterior thereof is hung on one side of hollow driving unit device 54 between two permanent magnet 60 through a plurality of elastic wire 66 (the number is 4 in preferred embodiment), the tracing movable block 64 may move up-down or left-right slightly under the force.

A balance movable block 67 having a through-hole 671, and the tracing coil 65 wound around the exterior thereof is hung on the other side of hollow driving unit device 54 between two permanent magnet 60 through a plurality of elastic wire 66 (the number is 4 in preferred embodiment), the tracing movable block 67 may move up-down or left-right slightly under the force.

Two steel wires 68 having splendid rigidity, one end of each steel wire 68 is bent upward to be a right angle, wherein one steel wire 68 passes through the through-hole 641 of tracing movable block 64, the end of the bent right angle connects to the movable reflector 41, the other steel wire 68 passes through the through-hole 671 of balance movable block 67, the end of the bent right angle connects to the balance block 43.

The pre-mentioned elastic wire 66 is also the leading wire of tracing coil 65, wherein as the tracing coil 65 is conducted with current, the tracing movable block 64 may move left or right (F-G direction in FIG. 5), and the steel wire 68 is locked in the through-hole 641 by the magnetic field produced from tracing coil, the steel wire 68 will move following the slight movement of tracing movable block 64 so that the tracing movable block 64 may move in F-G direction; if there is not current flowing through tracing coil 65, the steel wire 68 may move freely in through-hole 641.

Similarly, as the current opposite to the one passing through tracing movable block 64 flows through tracing coil 65, the balance movable block 67 may move left or right (H-I direction in FIG. 5), and the steel wire 68 will be locked in through-hole 671 by the magnetic field produced from tracing coil 65, the steel wire 68 will move following the slight movement of tracing movable block 67 so that the balance movable block 67 may move in H-I direction; the moving direction of balance movable block 67 is opposite to the one of tracing movable block 64, but the slight moving amplitude is of the same.

Besides, the pre-mentioned a plurality of elastic wires 66 used to hang the tracing movable block 64 and balance movable block 67 will make no influence on the rotation of hollow driving unit device 54.

Figure 4:
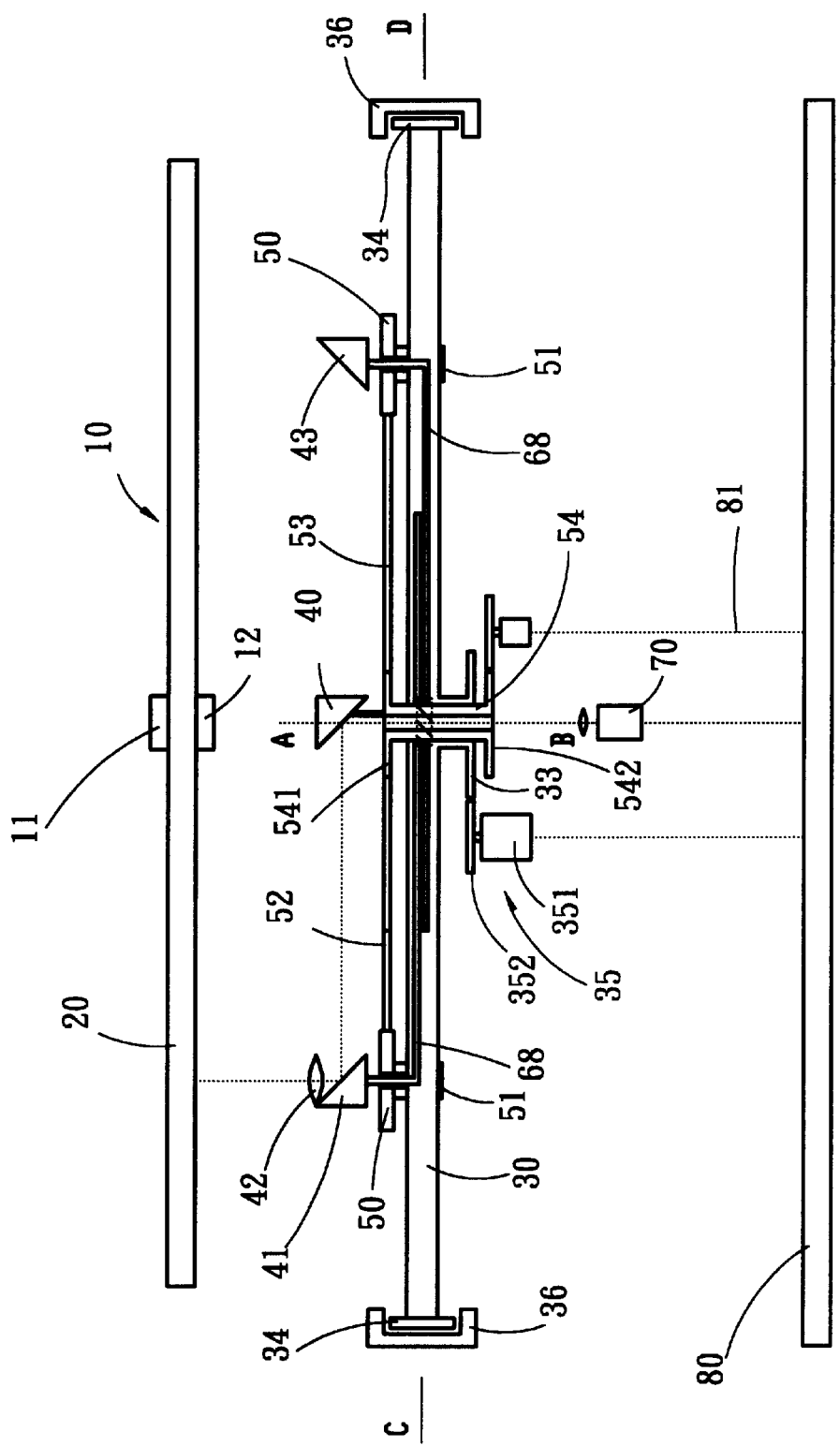
FIG. 4 is a schematic view showing one embodiment of the present invention.
Figure 5:
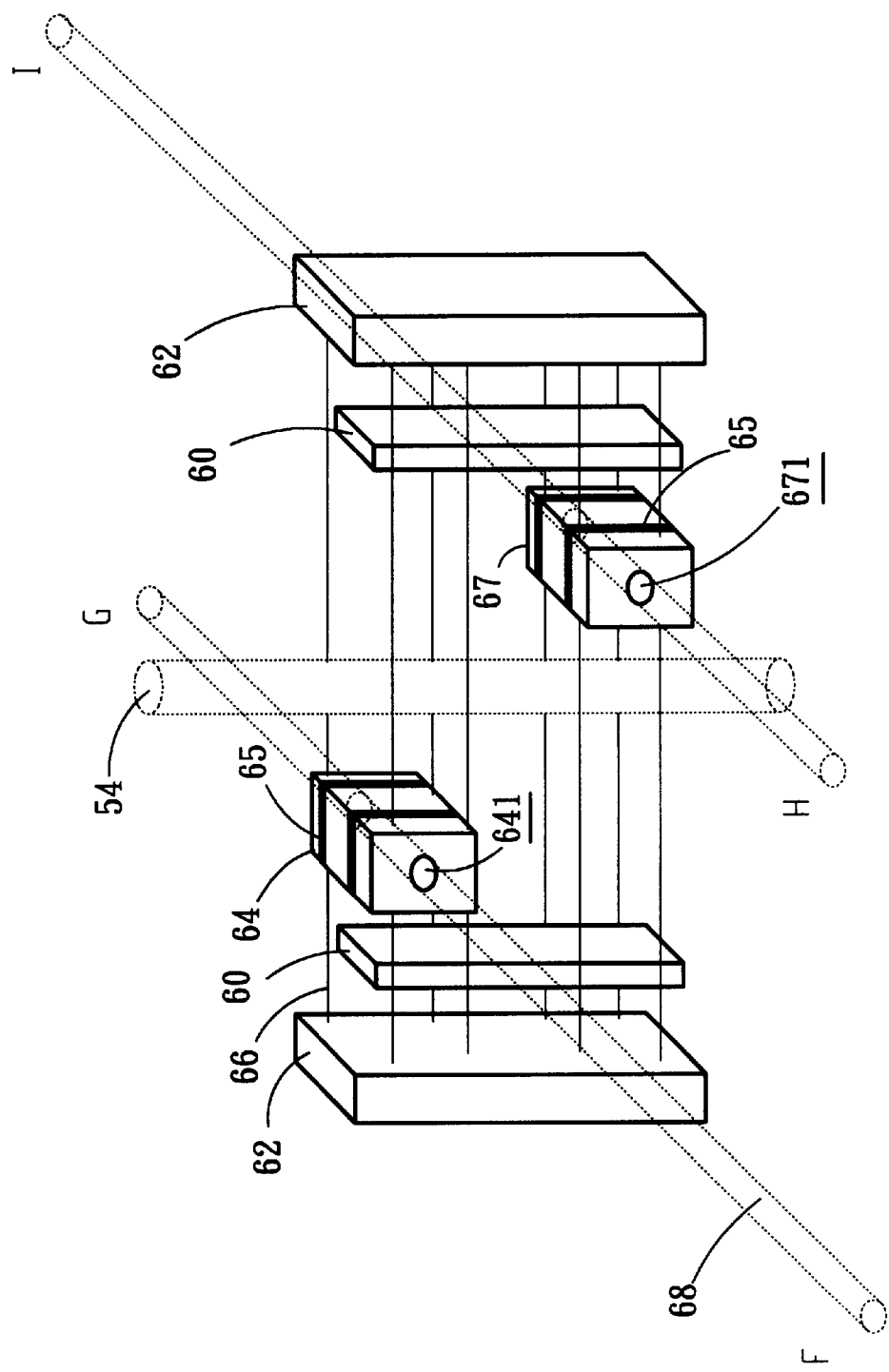
FIG. 5 is a 3D enlarged schematic view showing the precise tracing unit device of the present invention.
Figure 6:
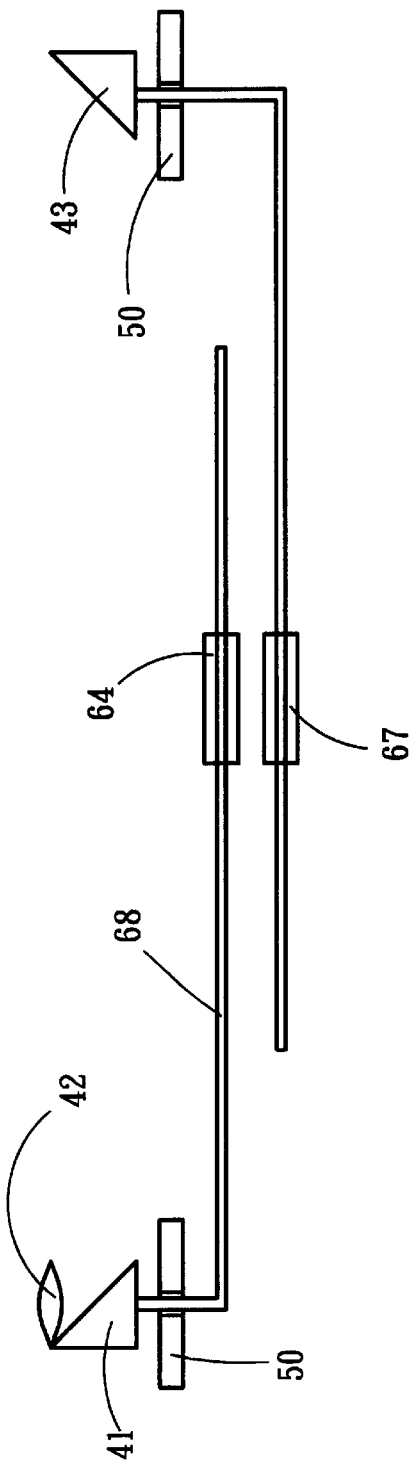
FIG. 6 is a schematic view showing the space configuration of the precise tracing unit device of the present invention.
Figure 7:
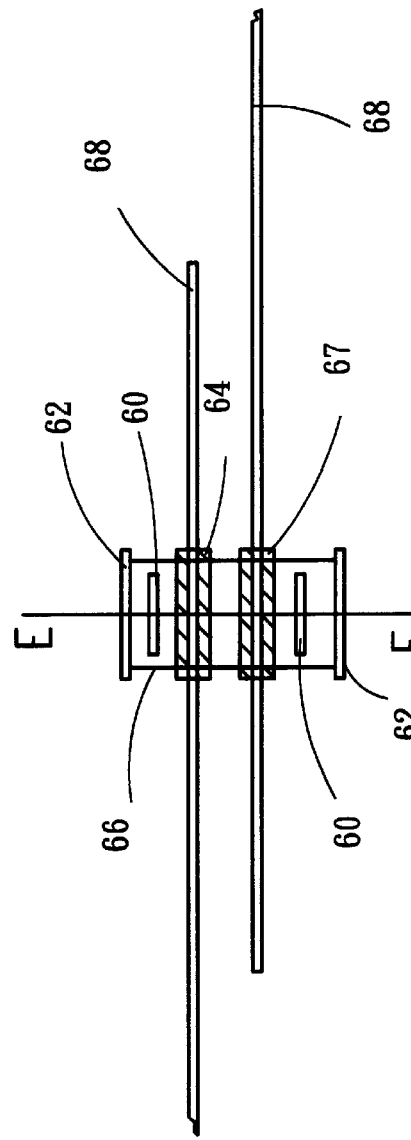
FIG. 7 is an elevational view of FIG. 6.

Referring to FIG. 4, the structural schematic view of the present invention is illustrated. The disk 20 is placed on the disk supporter 12 and then the disk press 11 is locked to the disk 20, thus the disk 20 cannot move. When a compact disk drive begins to work, the rotary needle 30 is driven by the rotary driving device 35 to rotate so that the engaged gears 33 and 352 rotate along the center axis A-B with high speed. At this time, the optical unit device and the displacing device will rotate with a high speed with the rotary needle 30. The precise tracing unit device in the rotary needle 30 rotates synchronously. Meanwhile, the movable reflector 41 and the balance block 43 reciprocally move leftwards and rightwards (along C-D direction) on the rotary needle 30. At this time, the whole rotation unit device is in a balance state. The fixed reflector 40 rotates with the rotary needle 30 synchronously with a high speed so as to retain the respective angle with respect to the movable reflector 41. Thus the optical beam from the laser head 70 passes through the fixed reflector 40 and is reflected to the movable reflector 41. Then the beam is focused to a track on the disk 20 by the focusing lens 42. Each beam reflected from the reflected layer of the disk 20 passes through the focusing lens 42, movable reflector 41 and fixed reflector 40 sequentially and then is received by the laser head 70. When the rotary needle 30 rotates with a high speed, and the reflector 41, focusing lens 42, and the balance block 43 move reciprocally along a straight line, the incident angle of the optical beam from the laser head 70 entering into the fixed reflector 40 is retained. Similarly, the incident angle that the beam is reflected by the fixed reflector 40 and then incidents into the movable reflector 41 is also remained. Each beam reflected by the reflecting layer of the disk 20 is received by the laser head 70 along an optical path. Then the beam is transferred to a control circuit board 80 through a data line 81 for further processing.

Moreover, as the gears 33, 352 drive the rotary needle 30 to rotate with a high speed, the concentric hollow driving unit device 54 of the gear 33 is not affected. Since the gear 33 and gear 352 are matched, the friction between is very small. Therefore, as the gear 541 drives the movable reflector 41 and the balance block 43, the gear 33 will not be affected.

The light floating wheels 34 at two ends of the rotary needle 30 rotate continuously along the C-D axis. When the light floating wheels 34 rotate continuously, the external edge thereof are in contact with the internal wall of annular device 36 for preventing the rotary needle 30 from a large vibration as it rotates with a high speed and has a predetermined flexibility and deformation. Meanwhile, the features of rotary needle 30, movable reflector 41, fixed reflector 40 and balance block 43 are all designed with streamline form to reduce the air resistance while rotating with high speed.

While the compact disk drive proceeds read/write operation, the rough tracing process is that the servo motor 55 drives movable reflector 41 to move leftwards and rightwards to proceed read/write track conversion, that is the disk 20 moves in radial process. The straight and reciprocal movement of the movable reflector 41 and the balance block 43 are driven by the rough tracing unit device. The servo motor 55 drives the gear 551, thereby the gears 541, 542 and the racks 52, 53 so that the rotation of the servo motor 55 is converted into the synchronously straight and reciprocal movement of the movable reflector 41 and balance block 43. At the time that the movable reflector 41 moves, the balance block 43 adjusts to a reverse direction for assuring the dynamic balance of the rotary needle 30. The servo motor 55 used to drive movable reflector 41 to proceed with rough tracing is controlled by the control circuit of the circuit board 80. This control circuit is the same as the one used to control laser head 70 and the subsidiary device thereof in present technique such that it is unnecessary to develop new control circuit.

After the rough tracing process is finished, the tracing error photoelectric detector is used to detect a compound signal containing tracing error signal. The signal is compared with the tracing error preset value. After being processed by the tracing error processing circuit, the signal is enlarged and then well tracing error signal is separated and is amplified. Then through an adjusting algorithm, a tracing driving voltage is outputted. Then the signal power is amplified through a driving circuit to be further applied to the tracing coil 65. Then a tracing coil 65 generates a magnetic field which is interacted with the magnetic field of two permanent magnets 60 so that the tracing movable block 64 moves leftwards and rightwards, and the steel wire 68 is locked to move slightly leftwards and rightwards so that the movable reflector 41 and focusing lens 42 move slightly leftwards and rightwards, thus the instantaneously tracing is realized.

Meanwhile, the tracing coil 65 of balance movable block 67 is passed through the current in opposite direction relative to the one passed through the tracing coil 65 of tracing movable block 64, thereby the balance movable block 67 produces slight movement opposite to the tracing movable block 64, and the steel wire 68 is locked to move slightly leftwards and rightwards, thus to adjust the balance block 43 to move slightly leftwards and rightwards to assure the dynamic balance of the whole rotary component.

The control circuit and chip used in controlling tracing signal are the same as the one used in tracing processing circuit for controlling laser head 70 focusing lens in present compact disk driving technology, thus it is unnecessary to develop new chip and processing circuit.

Besides, the control circuit board 30 used in the present invention is that used in the prior art. The circuit for controlling the disk 20 in the prior art circuit is used to control the rotation of the rotary needle 30. The circuit in the original circuit board for controlling laser head 70 and other components for controlling the straight and reciprocal movement are used to control the straight and reciprocal movements of the movable reflector 41 and balance block 43 on the rotary needle 30. No new technology about control circuits and control chips are desired to be developed. Thereby, the cost is low in the present invention In summary, the major characteristics of the lower inertial compact disk driving device provided in the present invention are shown as below. The disk and laser head are static and optical unit device is used as a medium of the laser optical path. Furthermore, the instantaneous precise tracing of the precise tracing unit device is realized. Moreover, the present invention is light and easily controlled, and has a simple structure and lower cost. The defect of heavy inertia, large power consumption and high heat energy of the prior art are improved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A lower inertial compact disk driving device comprising:
    a displacing device having a rotary needle for controlling the rotation of optical unit device and a rough tracing unit device for controlling the straight and reciprocal movement of the optical unit device for changing the position of a laser beam upon the laser head;
    an optical unit device installed on the rotary needle as a transfer unit device for transferring the laser beam from the laser head; and
    a precise tracing unit device for driving the optical unit device to move slightly so that laser beam transfers on the target track of the disk precisely.

2. The lower inertial compact disk driving device as recited in claim 1, wherein the said rotary needle is installed at a lower side of the disk and has a transversal groove and a hole at a center thereof; and a lower side of the hole is protruded with a gear that is integral with the rotary needle.

3. The lower inertial compact disk driving device as recited in claim 1, wherein two ends of the rotary needle are installed with respective light floating wheels; the light floating wheels rotate continuously along the transversal central axis of the rotary needle.

4. The lower inertial compact disk driving device as recited in claim 3, wherein the said rotary needle rotates on an annular device and in contact with the annular device for preventing the rotary needle from a large vibration as it rotates with a high speed and has a predetermined flexibility and deformation.

5. The lower inertial compact disk driving device as recited in claim 2, wherein the rotation of the said rotary needle is controlled by a rotation driving device; the rotation driving device is formed by a driving motor which is combined with a gear; and the gear is engaged with the gear integral with the rotary needle.

6. The lower inertial compact disk driving device as recited in claim 1, wherein the said optical unit device comprises:
    a fixed reflector firmly secured to a center of the rotary needle, which is used to reflect the laser beam to movable reflector or laser head;
    a movable reflector installed on one side of rotary needle, there is a focusing lens installed outside thereof at an appropriate angle for focusing the laser beam, which is used to focus the laser beam transferred from fixed reflector to the compact disk or transfer the beam reflected from the compact disk to the fixed reflector;
    a balance block installed at an opposite side of the movable reflector for retaining the balance of the rotary needle.

7. The lower inertial compact disk driving device as recited in claim 1, wherein the said rough tracing unit device comprising:
    two movable plate serving as the base for movable reflector and balance block, wherein the bottom thereof has a set of bushes which is engaged to the appropriate location at two sides of the rotary needle, respectively, and the side thereof has a rack installed at the side of movable reflector and balance block, respectively;
    a hollow driving unit device is secured to the inner edge of the hole; the upper and lower ends further are installed with gears; the upper gear is engaged with the two racks; and
    a servo motor engaged to a gear which is engaged to the lower gear of the hollow driving unit device for driving the movable reflector and the balance block to move straightly and reciprocally.

8. The lower inertial compact disk driving device as recited in claim 1, wherein the said precise tracing unit device comprising:
    a tracing movable block having a through-hole, and the tracing coil wound around the exterior thereof is hung on one side of hollow driving unit device between two permanent magnet through a plurality of elastic wire, the tracing movable block may move up-down or left-right slightly under the force;
    a balance movable block having a through-hole, and the tracing coil wound around the exterior thereof is hung on the other side of hollow driving unit device between two permanent magnet through a plurality of elastic wire, the balance movable block may move up-down or left-right slightly under the force;
    two steel wires having splendid rigidity, one end of each steel wire is bent upward to be a right angle, wherein one steel wire passes through the through-hole of tracing movable block, the end of the bent right angle connects to the movable reflector, the other steel wire passes through the through-hole of balance movable block, the end of the bent right angle connects to the balance block.

9. The lower inertial compact disk driving device as recited in claim 8, wherein the said elastic wire is the leading wire of tracing coil.

10. The lower inertial compact disk driving device as recited in claim 8, wherein as the said tracing coil is conducted with current, the produced magnetic field interacts with the two permanent magnet, resulting in the slight movement of tracing movable block, balance movable block leftwards and rightwards.

11. The lower inertial compact disk driving device as recited in claim 10, wherein the current passes through the balance movable block wound around tracing coil and the current passes through the balance movable block wound around tracing coil are with equal magnitude and in opposite direction, resulting in the tracing movable block and balance movable block slightly moving in opposite direction and of the same amplitude.

* * * * *